(12) United States Patent
Ito et al.

(10) Patent No.: US 8,075,448 B2
(45) Date of Patent: *Dec. 13, 2011

(54) OIL PRESSURE CONTROL APPARATUS FOR AUTOMATIC TRANSMISSION

(75) Inventors: Masahiro Ito, Okazaki (JP); Munehiro Tashiro, Okazaki (JP); Kenichi Tsuchida, Haza (JP); Naoyuki Fukaya, Okazaki (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 12/822,454

(22) Filed: Jun. 24, 2010

(65) Prior Publication Data

US 2011/0023981 A1 Feb. 3, 2011

(30) Foreign Application Priority Data

Jul. 28, 2009 (JP) ................................. 2009-175091

(51) Int. Cl.
*F16H 61/26* (2006.01)
(52) U.S. Cl. ........................................ 477/131; 477/906
(58) Field of Classification Search .................. 477/906, 477/122, 123, 116, 127, 128, 131
See application file for complete search history.

(56) References Cited

U.S. PATENT DOCUMENTS

| 7,905,807 B2 * | 3/2011 | Shimizu et al. ................... 475/5 |
| 2008/0200301 A1 | 8/2008 | Shimizu et al. |
| 2008/0207375 A1 | 8/2008 | Shimizu et al. |
| 2011/0066339 A1 * | 3/2011 | Shimizu et al. ................. 701/58 |

FOREIGN PATENT DOCUMENTS

| JP | A-2004-003550 | 1/2004 |
| JP | A 2005-098432 | 4/2005 |
| JP | A-2008-157425 | 7/2008 |
| JP | A-2008-157426 | 7/2008 |
| JP | A 2009-150532 | 7/2009 |
| WO | WO 2008/078530 A1 | 7/2008 |
| WO | WO 2008/078531 A1 | 7/2008 |

OTHER PUBLICATIONS

Translation of Sep. 21, 2010 International Search Report issued in International Application No. PCT/JP2010/004011.

\* cited by examiner

*Primary Examiner* — Justin Holmes
(74) *Attorney, Agent, or Firm* — Oliff & Berridge, PLC

(57) ABSTRACT

An oil pressure control apparatus for an automatic transmission configured with an oil pressure servo that engages and disengages a friction engagement element. The friction element is engaged by first and second hydraulic oil chambers that individually provide low torque, and can provide a higher torque when working in combination. A failure solenoid valve outputs a signal when a failure occurs to stop oil pressure to an oil pressure servo. Valves are configured to determine whether oil pressure is supplied to or discharged from the first and second hydraulic oil chambers. A switching valve is switched on the basis of the failure signal, and an oil pressure can be individually supplied to and discharged from the first and second hydraulic oil chambers based on the status of the switching solenoid valve and the signal from the failure solenoid valve.

4 Claims, 3 Drawing Sheets

FIG.2

|     | C-1 | C-2 | C-3 | C-4 | B-1 | B-2 | F-1 |
|-----|-----|-----|-----|-----|-----|-----|-----|
| P   |     |     |     |     |     |     |     |
| REV |     |     | ○   |     |     | ○   |     |
| N   |     |     |     |     |     |     |     |
| 1ST | ○   |     |     |     |     | (○) | ○   |
| 2ND | ○   |     |     |     | ○   |     |     |
| 3RD | ○   |     | ○   |     |     |     |     |
| 4TH | ○   |     |     | ○   |     |     |     |
| 5TH | ○   | ○   |     |     |     |     |     |
| 6TH |     | ○   |     | ○   |     |     |     |
| 7TH |     | ○   | ○   |     |     |     |     |
| 8TH |     | ○   |     |     |     | ○   |     |

(○): DURING ENGINE BRAKING

OIL PRESSURE CONTROL APPARATUS FOR AUTOMATIC TRANSMISSION

The disclosure of Japanese Patent Application No. 2009-175091 filed on Jul. 28, 2009 including the specification, drawings and abstract is incorporated herein by reference in its entirety.

BACKGROUND OF THE INVENTION

The present invention pertain to an oil pressure control apparatus for an automatic transmission mounted on a vehicle, for example, and relates in particular to an oil pressure control apparatus for an automatic transmission in which an oil pressure servo that engages and disengages one friction engagement element includes two hydraulic oil chambers so that the friction engagement element is engaged with a low torque capacity when an oil pressure is supplied to one of the hydraulic oil chambers and with a high torque capacity when an oil pressure is supplied to the two hydraulic oil chambers.

DESCRIPTION OF THE RELATED ART

In the related art, there has been proposed a multi-speed automatic transmission mounted on a vehicle or the like and including a friction engagement element (refer to a brake 13-2 disclosed in Japanese Patent Application Publication No. JP-A-2005-098432) which is engaged during engine braking at shift speeds (1st and 2nd) established by engagement of a one-way clutch, for example, and which is also engaged at reverse speeds (REV1 and REV2). Such a friction engagement element requires a low transfer torque capacity during engine braking, for example, and a high transfer torque capacity at reverse speeds. Therefore, an oil pressure servo for the friction engagement element includes a hydraulic oil chamber on the inner peripheral side (inner oil chamber) and a hydraulic oil chamber on the outer peripheral side (outer oil chamber), that is, the friction engagement element can be engaged and disengaged by two oil pressure servos (refers to an oil pressure servo 70 shown in FIG. 1 of Japanese Patent Application Publication No. JP-A-2005-098432).

That is, a hydraulic oil pressure is supplied to only the hydraulic oil chamber on the inner peripheral side (inner oil chamber) during engine braking at forward shift gears, for example, and to both the hydraulic oil chamber on the inner peripheral side (inner oil chamber) and the hydraulic oil chamber on the outer peripheral side (outer oil chamber) at reverse speeds. This allows a required torque capacity to be achieved with little loss. In order to establish a reverse speed, hydraulic oil may be supplied first to the hydraulic oil chamber on the outer peripheral side (outer oil chamber) for initial engagement, and subsequently to the hydraulic oil chamber on the inner peripheral side (inner oil chamber). This enables oil pressure control in which a reverse speed is established responsively and a high torque capacity is achieved eventually.

SUMMARY OF THE INVENTION

In order to individually supply and discharge an oil pressure to and from the two hydraulic oil chambers for one friction engagement element as discussed above, however, it is necessary to provide two switching valves that individually supply an oil pressure to and block the supply of an oil pressure to (discharge an oil pressure from) the two hydraulic oil chambers and, in addition, two switching solenoid valves that independently switch the two switching valves. This enables oil pressure control in which a hydraulic oil pressure is supplied first to the hydraulic oil chamber on the outer peripheral side (outer oil chamber) for initial engagement, and subsequently to the hydraulic oil chamber on the inner peripheral side (inner oil chamber), for example, which reduces a speed change shock.

Meanwhile, in recent years, oil pressure control apparatuses for automatic transmissions in which a control pressure adjusted by a linear solenoid valve is directly supplied to and discharged from an oil pressure servo for a friction engagement element have become the mainstream along with improvement in the performance of linear solenoid valves. If a normally open linear solenoid valve which outputs an oil pressure when not energized is used in such an oil pressure control apparatus, electricity is always consumed to close the valve during running, and the friction engagement element may unnecessarily be engaged when a failure occurs. Therefore, it is desirable to use a normally closed linear solenoid valve as much as possible. However, in the case where a failure such as a battery short circuit or a wire breakage (solenoid all-off failure) occurs, for example, the linear solenoid valve may be closed to disengage each friction engagement element into a neutral state. Thus, in order to keep the vehicle running even in case of such a solenoid all-off failure, there has been considered a configuration in which a fail-safe switching valve is switched using a normally open failure solenoid valve to short-cut a line pressure or a range pressure, for example, to an oil pressure servo for a friction engagement element so that an engagement pressure for a friction engagement element which has been engaged before the failure will be secured (see Japanese Patent Application No. 2008-212217, which was not published at the time of filing of the present application).

However, providing two switching solenoid valves and a failure solenoid valve as discussed above requires three solenoid valves which are expensive. This increases not only the cost of the automatic transmission but also the size of the automatic transmission less compact.

It is therefore an object of the present invention to provide an oil pressure control apparatus for an automatic transmission in which an oil pressure can be individually supplied to and discharged from two hydraulic oil chambers that engage and disengage one friction engagement element and which enables a cost reduction and a size reduction by reducing the number of solenoid valves without losing a fail-safe function.

A first aspect of the present invention provides an oil pressure control apparatus for an automatic transmission in which an oil pressure servo that engages and disengages one friction engagement element includes first and second hydraulic oil chambers to engage the friction engagement element with a low torque capacity when an oil pressure is supplied to the first hydraulic oil chamber or the second hydraulic oil chamber and with a torque capacity higher than the low torque capacity when an oil pressure is supplied to both the first and second hydraulic oil chambers, and the oil pressure control apparatus includes a failure solenoid valve that can output a failure signal pressure when a failure occurs and a failure switching valve that is switched from a normal position to a failure position on the basis of the failure signal pressure, and is constructed to secure continuous supply of an oil pressure to an oil pressure servo for a friction engagement element which has been engaged before the failure switching valve is switched when the failure switching valve is switched. The oil pressure control apparatus includes: a first switching valve that changes whether an oil pressure is supplied to or discharged from the first hydraulic oil chamber; a second switching valve that changes whether an oil pressure is supplied to or discharged from the second hydraulic oil chamber; and a switching solenoid valve that can output a switching signal pressure that switches the first switching valve. In the oil pressure control apparatus, the second switching valve is switched on the basis of the failure signal pressure, and an oil pressure can be individually supplied to and discharged from the first and second hydraulic oil chambers on the basis of the switching signal pressure from the switching solenoid valve and the failure signal pressure from the failure solenoid valve.

Specifically, the oil pressure control apparatus according to a second aspect of the present invention may further include a third switching valve that is switched by the failure signal pressure, and in the oil pressure control apparatus, the second switching valve may include a spool, an urging member that urges the spool to one side, a first oil chamber that is provided at one end of the spool and that receives the switching signal pressure to cause the switching signal pressure to act on the spool against an urging force of the urging member, and a second oil chamber that is provided at the other end of the spool and that receives the switching signal pressure via the third switching valve, and the second switching valve may be switched on the basis of the failure signal pressure when the switching signal pressure is output and the failure signal pressure is output and the third switching valve is switched to block the switching signal pressure for the second oil chamber such that the switching signal pressure is not input to the second oil chamber.

In the oil pressure control apparatus according to a third aspect of the present invention, particularly, the one friction engagement element may be a friction engagement element to be engaged in a reverse range, the oil pressure control apparatus may include a manual shift valve that outputs a reverse range pressure from a reverse range pressure output port in the reverse range, the first switching valve may be interposed between the reverse range pressure output port and the first hydraulic oil chamber, and blocks the reverse range pressure for the first hydraulic oil chamber when the first switching valve is switched on the basis of the switching signal pressure, and the second switching valve may be interposed between the reverse range pressure output port and the second hydraulic oil chamber, and blocks the reverse range pressure for the second hydraulic oil chamber when the switching signal pressure for the second oil chamber is blocked on the basis of the failure signal pressure to switch the second switching valve.

In the oil pressure control apparatus according to a fourth aspect of the present invention, more particularly, the one friction engagement element may be a friction engagement element to be engaged during coasting at a low shift speed in a forward range, the oil pressure control apparatus may include an engagement pressure solenoid valve that can perform pressure adjustment control on at least an engagement pressure ($P_{SLC2}$) to be supplied to an oil pressure servo for a friction engagement element to be engaged at a high shift speed in the forward range, and the third switching valve may be formed by a valve that distributes the engagement pressure output from the engagement pressure solenoid valve to the oil pressure servo for the friction engagement element to be engaged at the high shift speed in the forward range and via the first switching valve to the first hydraulic oil chamber in accordance with a switching position of the third switching valve.

According to the first aspect of the present invention, the first switching valve is switched on the basis of the switching signal pressure from the switching solenoid valve, and the second switching valve is switched on the basis of the failure signal pressure from the failure solenoid valve. Thus, an oil pressure can be individually supplied to and discharged from the first and second hydraulic oil chambers by two solenoid valves, namely the failure solenoid valve which switches the failure switching valve and the switching solenoid valve, without losing a fail-safe function. The failure solenoid valve secures supply of an oil pressure to an oil pressure servo for a friction engagement element which has been engaged before the failure switching valve is switched when the failure switching valve is switched. Thus, the failure signal pressure can be output from the failure solenoid valve during normal running. Thus, the number of solenoid valves can be reduced, thereby reducing the cost and the size of the oil pressure control apparatus.

According to the second aspect of the present invention, the second switching valve is switched when the switching signal pressure is input to the first and second oil chambers and the failure signal pressure is output to switch the third switching valve such that the switching signal pressure for the second oil chamber is blocked by the third switching valve and is not input to the second oil chamber. Thus, the second switching valve can be switched on the basis of whether or not the failure signal pressure is output. That is, the failure solenoid valve can change whether an oil pressure is supplied to or discharged from the second hydraulic oil chamber. Since the same switching signal pressure is input to the first and second oil chambers, no pressure difference occurs between the oil chambers to prevent the second switching valve from being erroneously switched.

According to the third aspect of the present invention, the first switching valve is interposed between the reverse range pressure output port and the first hydraulic oil chamber, and blocks the reverse range pressure for the first hydraulic oil chamber when the first switching valve is switched on the basis of the switching signal pressure, while the second switching valve is interposed between the reverse range pressure output port and the second hydraulic oil chamber, and blocks the reverse range pressure for the second hydraulic oil chamber when the second switching valve is switched with the switching signal pressure for the second oil chamber blocked on the basis of the failure signal pressure. Thus, the reverse range pressure can be individually supplied to and discharged from the first hydraulic oil chamber and the second hydraulic oil chamber in the oil pressure servo for the friction engagement element to be engaged in the reverse range.

According to the fourth aspect of the present invention, the one friction engagement element which is engaged and disengaged by an oil pressure in the first hydraulic oil chamber is a friction engagement element to be engaged during coasting at a low shift speed in a forward range, and the third switching valve is formed by a valve that distributes the engagement pressure output from the engagement pressure solenoid valve to the oil pressure servo for the friction engagement element to be engaged at the high shift speed in the forward range and via the first switching valve to the first hydraulic oil chamber in accordance with a switching position of the third switching valve. Thus, the engagement pressure from the engagement pressure solenoid valve can be supplied to the first hydraulic oil chamber during coasting at a low shift speed, for which a low torque capacity is sufficient. The valve can be commonly used as the third switching valve which blocks the switching signal pressure for the second oil chamber of the second switching valve, which eliminates the need to provide an additional valve, enabling reduction of the cost and the size of the oil pressure control apparatus.

BRIEF DESCRIPTION OF THE DRAWINGS

FIG. 2 is an operation table showing how the automatic transmission operates.

DETAILED DESCRIPTION OF THE EMBODIMENTS

Figure 1:
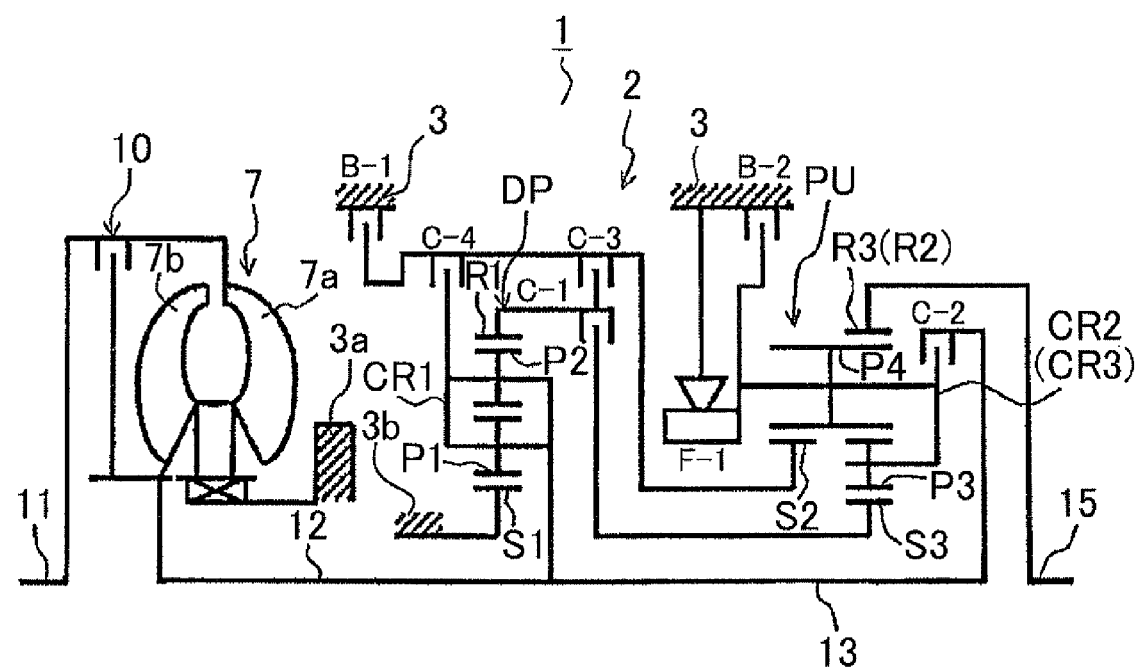
FIG. 1 is a skeleton diagram showing an automatic transmission to which the present invention is applicable.

An embodiment of the present invention will be described below with reference to FIGS. 1 to 3.

[Configuration of Automatic Transmission]

First, a schematic configuration of a multi-speed automatic transmission 1 (hereinafter simply referred to as an "automatic transmission") to which the present invention is applicable will be described with reference to FIG. 1. As shown in FIG. 1, the automatic transmission 1, which is suitable for use in FR (front-engine rear-drive) vehicles, for example, includes an input shaft 11 connectable to an engine (not shown), and a torque converter 7 and a speed change mechanism 2 centered on the axis of the input shaft 11.

The torque converter 7 includes a pump impeller 7a connected to the input shaft 11 of the automatic transmission 1, and a turbine runner 7b to which rotation of the pump impeller 7a is transferred via a hydraulic fluid. The turbine runner 7b is connected to an input shaft 12 of the speed change mechanism 2 disposed coaxially with the input shaft 11. The torque converter 7 includes a lock-up clutch 10. When the lock-up clutch 10 is engaged through oil pressure control performed by an oil pressure control apparatus to be discussed later, rotation of the input shaft 11 of the automatic transmission 1 is directly transferred to the input shaft 12 of the speed change mechanism 2.

The speed change mechanism 2 includes a planetary gear DP and a planetary gear unit PU provided on the input shaft 12 (and an intermediate shaft 13). The planetary gear DP is a so-called double-pinion planetary gear, which includes a sun gear S1, a carrier CR1, and a ring gear R1 and, and in the planetary gear DP, the carrier CR1 includes a pinion P1 meshed with the sun gear S1 and a pinion P2 meshed with the ring gear R1 in a manner such that the pinion P1 and the pinion P2 mesh with each other.

The planetary gear unit PU is a so-called Ravigneaux type planetary gear, which includes four rotary elements, namely a sun gear S2, a sun gear S3, a carrier CR2 (CR3), and a ring gear R3 (R2), and in the planetary gear unit PU, the carrier CR2 includes a long pinion P4 meshed with the sun gear S2 and the ring gear R3 and a short pinion P3 meshed with the long pinion P4 and the sun gear S3 in a manner such that the long pinion P4 and the short pinion P3 mesh with each other.

The sun gear S1 of the planetary gear DP is connected to a boss 3b extended from a body of an oil pump 3a integrally fixed to a transmission case 3, for example, so as not to be rotatable. The carrier CR1 is connected to the input shaft 12 so as to be rotatable at the same speed as rotation of the input shaft 12 (hereinafter referred to as "input rotation"). The carrier CR1 is also connected to a fourth clutch C-4. The ring gear R1 rotates at a speed reduced from the speed of the input rotation by the fixed sun gear S1 and the carrier CR1 which makes the input rotation. The ring gear R1 is connected to a first clutch C-1 (friction engagement element) and a third clutch C-3.

The sun gear S2 of the planetary gear unit PU is connected to a first brake B-1 so as to be selectively fixed with respect to the transmission case 3. The sun gear S2 is also connected to the fourth clutch C-4 and the third clutch C-3 so as to selectively receive the input rotation of the carrier CR1 via the fourth clutch C-4 and the reduced-speed rotation of the ring gear R1 via the third clutch C-3. The sun gear S3 is connected to the first clutch C-1 so as to selectively receive the reduced-speed rotation of the ring gear R1.

The carrier CR2 is connected to a second clutch C-2 (friction engagement element), to which rotation of the input shaft 12 is input via the intermediate shaft 13, so as to selectively receive the input rotation via the second clutch C-2. The carrier CR2 is also connected to a one-way clutch F-1 and a second brake B-2 (one friction engagement element, a friction engagement element to be engaged in the reverse range, a friction engagement element to be engaged during coasting at a low shift speed) so as to be restricted from rotating in one direction with respect to the transmission case 3 via the one-way clutch F-1 and so as to be selectively fixed (unrotatable) via the second brake B-2. The ring gear R3 is connected to an output shaft 15 that outputs rotation to drive wheels (not shown).

In the automatic transmission 1 configured as described above, the clutches C-1 to C-4, the brakes B-1 and B-2, and the one-way clutch F-1 are operated as defined in the operation table shown in FIG. 2 to establish each of the first to eighth forward speeds and the reverse speed, which forms the shift speeds at an appropriate step ratio. Shift control is executed by selecting which of the clutches C-1 to C-4 and the brakes B-1 and B-2 to be engaged. Two of the clutches C-1 to C-4 and the brakes B-1 and B-2 are engaged to establish each shift speed excluding the first forward speed (low shift speed).

[Schematic Configuration of Oil Pressure Control Apparatus]

An oil pressure control apparatus 20 for the automatic transmission according to the present invention will be described subsequently with reference to FIG. 3. First, a portion (not shown) of the oil pressure control apparatus 20 that generates a line pressure, a secondary pressure, a modulator pressure, and a range pressure, etc. will be described roughly. The portion that generates a line pressure, a secondary pressure, a modulator pressure, and a range pressure is similar to that of a general oil pressure control apparatus for an automatic transmission which is widely known, and thus will be described briefly.

The oil pressure control apparatus 20 includes an oil pump, a manual shift valve, a primary regulator valve, a secondary regulator valve, a solenoid modulator valve, and a linear solenoid valve SLT (not shown), for example. When the engine is started, for example, the oil pump 3a rotatably coupled to the pump impeller 7a of the torque converter 7 is driven in conjunction with rotation of the engine to produce an oil pressure by suctioning oil from an oil pan (not shown) via a strainer.

The oil pressure produced by the oil pump 3a is adjusted to a line pressure $P_L$ with discharge adjustment performed by the primary regulator valve on the basis of a signal pressure $P_{SLT}$ of the linear solenoid valve SLT output with pressure adjustment performed in accordance with a throttle opening. The line pressure $P_L$ is supplied to a manual shift valve 26 to be discussed later, the solenoid modulator valve, and a linear solenoid valve SLC3 (not shown). The line pressure $P_L$ supplied to the solenoid modulator valve is adjusted by the valve to a generally constant modulator pressure $P_{MOD}$. The modulator pressure $P_{MOD}$ is supplied as a source pressure to the linear solenoid valve SLT and solenoid valves S1 and S2 to be discussed in detail later.

The pressure discharged from the primary regulator valve is adjusted to a secondary pressure $P_{SEC}$ with further discharge adjustment performed by the secondary regulator valve, for example. The secondary pressure $P_{SEC}$ is supplied not only to a lubricating oil passage and an oil cooler, for example, but also to the torque converter 7. The secondary pressure $P_{SEC}$ is also used to control the lock-up clutch 10.

Figure 3:
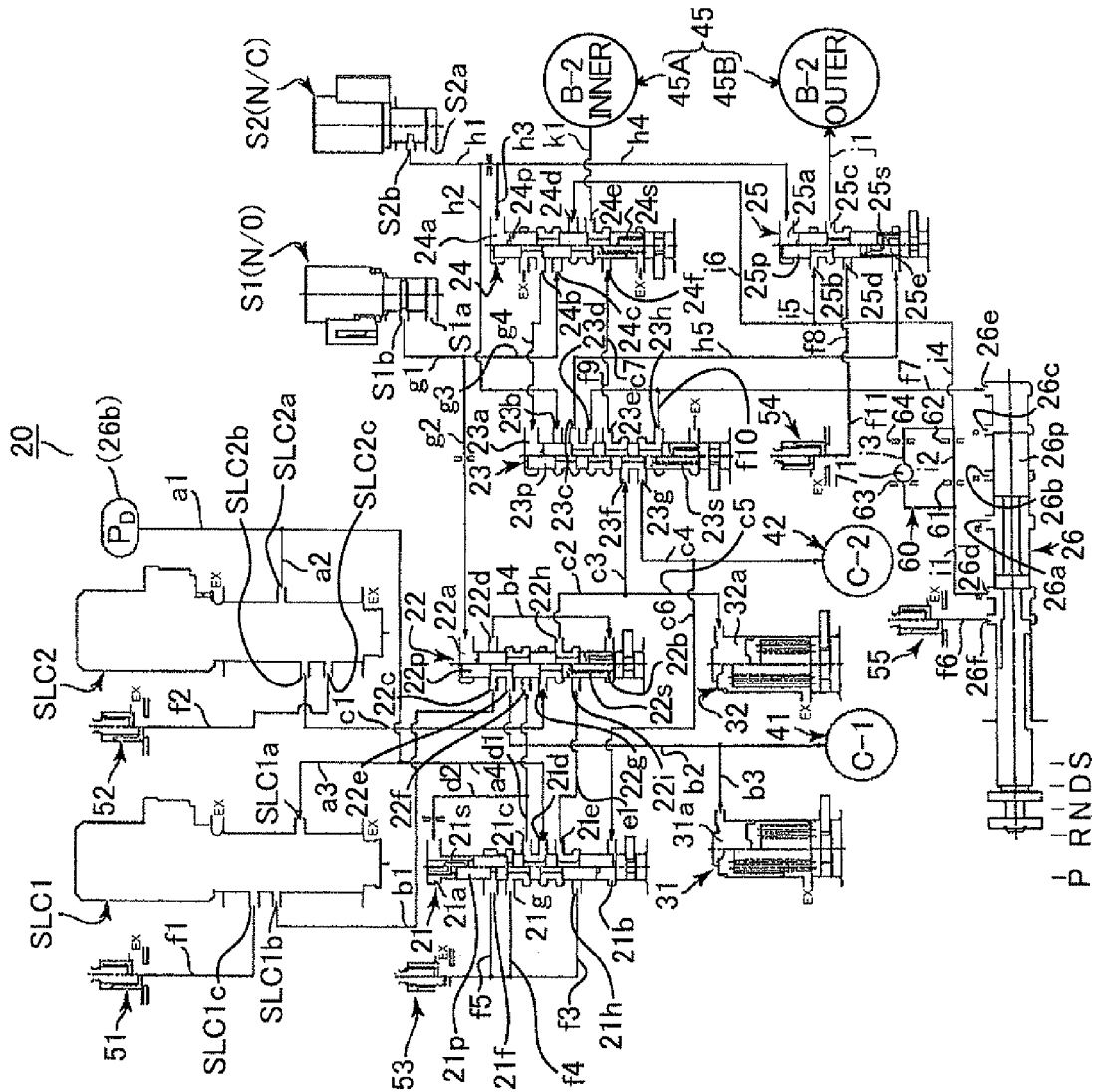
FIG. 3 is a circuit diagram showing an oil pressure control apparatus for the automatic transmission.

Meanwhile, as shown in FIG. 3, the manual shift valve 26 includes a spool 26p mechanically (or electrically) driven by a shift lever provided in a driver's seat (not shown). Whether the input line pressure $P_L$ is output or not output (drained) is determined by changing the position of the spool 26p in accordance with a shift range selected using the shift lever, that is, in accordance with which of a parking range (P range), a reverse range (R range), a neutral range (N range), a drive range (D range), and a sport range (S range) is selected.

More specifically, when the manual shift valve 26 is operated to the D range (or the S range) on the basis of an operation of the shift lever, an input port 26a to which the line pressure $P_L$ is input is communicated with a forward range pressure output port 26b on the basis of the position of the spool 26p so that the line pressure $P_L$ is output from the forward range pressure output port 26b as a forward range pressure (D range pressure) $P_D$. When the manual shift valve 26 is moved to the R range on the basis of an operation of the shift lever, the input port 26a is communicated with a reverse range pressure output port 26d on the basis of the position of the spool 26p so that the line pressure $P_L$ is output from the reverse range pressure output port 26d as a reverse range pressure (R range pressure) $P_R$. When the manual shift valve 26 is moved to the P range or the N range on the basis of an operation of the shift lever, the spool blocks communication between the input port 26a and the forward range pressure output port 26b and the reverse range pressure output port 26d. Also, the spool allows a forward range pressure discharge port 26e to be communicated with a discharge port 26e so that oil is drained (discharged) via oil passages f7 and f11 and a check valve 54, and allows the reverse range pressure output port 26d to be communicated with a discharge port 26f so that oil is drained (discharged) via an oil passage f6 and a check valve 55. That is, the D range pressure $P_D$ and the R range pressure $P_R$ are not output.

[Configuration of Speed Change Control Portion in Oil Pressure Control Apparatus]

Then, a portion of the oil pressure control apparatus 20 that mainly performs speed change control will be described. In the embodiment, in order to describe the position of each spool, the terms "right-half position" and "left-half position" are used to refer to the respective positions of the right half and the left half of each spool shown in FIG. 3.

The oil pressure control apparatus 20 includes a total of six oil pressure servos, namely an oil pressure servo 41 for the clutch C-1 discussed above, an oil pressure servo 42 for the clutch C-2, an oil pressure servo (not shown) for the clutch C-3, an oil pressure servo (not shown) for the clutch C-4, an oil pressure servo (not shown) for the brake B-1, and an oil pressure servo 45 for the brake B-2. The oil pressure control apparatus 20 also includes five linear solenoid valves SLC1, SLC2, SLC3 (not shown), SLC4 (not shown), and SLB1 (not shown) that directly supply an output pressure adjusted as an engagement pressure to the respective oil pressure servos. That is, in order to facilitate understanding of the essence of the present invention, three oil pressure servos and three linear solenoid valves are not shown in FIG. 3.

The oil pressure control apparatus 20 shown in FIG. 3 includes the manual shift valve 26, the two linear solenoid valves SLC1 and SLC2, the solenoid valves S1 and S2, a first clutch application relay valve 21, a second clutch application relay valve (failure switching valve) 22, a C-2 supply relay valve (third switching valve) 23, a first B-2 relay valve (first switching valve) 24, and a second B-2 relay valve (second switching valve) 25, etc., which serve as a portion that supplies and discharges an oil pressure to and from the clutch C-1, the clutch C-2, and the brake B-2, a portion that achieves a fail-safe function, and a portion that distributes an output pressure of the linear solenoid valve SLC2 to the oil pressure servo 42 for the clutch C-2 and the oil pressure servo 45 for the brake B-2.

The forward range pressure output port 26b of the manual shift valve 26 discussed above is connected to oil passages a1, a2, a3, and a4 shown in FIG. 3 via an oil passage (not shown) so that the forward range pressure $P_D$ can be input to the oil passages a1, a2, a3, and a4. The reverse range pressure output port 26d of the manual shift valve 26 is connected to oil passages i1, i2, i3, i4, i5, and i6 so that the reverse range pressure $P_R$ can be input to the oil passages i1, i2, i3, i4, i5, and i6.

A so-called check ball mechanism 60 is formed by orifices 61 and 62 provided in the oil passage i2, orifices 63 and 64 provided in the oil passage i3, and a check ball 71 that contacts and separates from the orifice 63 such that the reverse range pressure $P_R$ is supplied through both the oil passages i2 and i3 and discharged through only the oil passage i2 with the oil passage i3 blocked by the check ball 71.

The oil passages a1 and a4, of the oil passages a1 to a4, are connected to an input port 21d of the first clutch application relay valve 21 to be discussed in detail later. The oil passages a1 and a2 are connected to an input port SLC2a of the linear solenoid valve SLC2. The oil passages a1 and a3 are connected to an input port SLC1a of the linear solenoid valve SLC1.

The linear solenoid valve SLC1 is a normally closed valve that outputs no oil pressure when not energized. The linear solenoid valve SLC1 includes the input port SLC1a that receives the forward range pressure $P_D$ via the oil passage a3, an output port SLC1b that outputs a control pressure $P_{SLC1}$, obtained by pressure adjustment of the forward range pressure $P_D$, to the oil pressure servo 41 via oil passages b1 and b2 as an engagement pressure $P_{C1}$, and a discharge port SLC1c that discharges the control pressure $P_{SLC1}$ (engagement pressure $P_{C1}$) in the oil passage b1 via an oil passage f1 and a check valve 51.

That is, when not energized, the linear solenoid valve SLC1 outputs no oil pressure with the input port SLC1a and the output port SLC1b not communicated with each other and with the output port SLC1b and the discharge port SLC1c communicated with each other. When energized on the basis of a command value from a control section (ECU) (not shown), the linear solenoid valve SLC1 increases the amount of communication (amount of opening) between the input port SLC1a and the output port SLC1b in accordance with the command value, that is, outputs the engagement pressure $P_{C1}$ in accordance with the command value. The output port SLC1b of the linear solenoid valve SLC1 is connected to an input port 22c of the second clutch application relay valve 22 to be discussed later via the oil passage b1.

Meanwhile, the linear solenoid valve (engagement pressure solenoid valve) SLC2 is a normally open valve that outputs an oil pressure when not energized. The linear solenoid valve SLC2 includes the input port SLC2a that receives the forward range pressure $P_D$ via the oil passage a2, an output port SLC2b that outputs a control pressure $P_{SLC2}$, which is obtained by pressure adjustment of the forward range pressure $P_D$, to the oil pressure servo 42 as an engagement pressure $P_{C2}$ (or engagement pressure $P_{B2}$), and a discharge port SLC2c that discharges the control pressure $P_{SLC2}$ (engagement pressure $P_{C2}$ or engagement pressure $P_{B2}$) in an oil passage c1 via an oil passage f2 and a check valve 52.

That is, when not energized, the linear solenoid valve SLC2 outputs an oil pressure with the input port SLC2a and the output port SLC2b communicated with each other. When energized on the basis of a command value from the control section (ECU) (not shown), the linear solenoid valve SLC2 increases the amount of communication between the output port SLC2b and the discharge port SLC2c while reducing the amount of communication between the input port SLC2a and the output port SLC2b (that is, narrows the opening) in accordance with the command value, that is, outputs the engagement pressure P (or $P_{B2}$) in accordance with the command value. The output port SLC2b of the linear solenoid valve SLC2 is connected to an input port 22g of the second clutch application relay valve 22 to be discussed later via the oil passage c1.

The solenoid valve (failure solenoid valve) S1 is a normally open valve that outputs an oil pressure when not energized. The solenoid valve S1 includes an input port S1a that receives the modulator pressure $P_{MOD}$ via an oil passage (not shown), and an output port S1b that outputs the modulator pressure $P_{MOD}$ generally as it is as a signal pressure (failure signal pressure) $P_{s1}$ when not energized (that is, when turned off). That is, the solenoid valve S1 can selectively output the signal pressure $P_{s1}$. The output port S1b is connected to an oil chamber 22a of the second clutch application relay valve 22 via oil passages g1 and g2, to an input port 24c of the first B-2 relay valve 24 via the oil passage g1 and an oil passage g3, and to an oil chamber 23a of the C-2 supply relay valve 23 via an output port 24b of the first B-2 relay valve 24 and an oil passage g4.

Meanwhile, the solenoid valve (switching solenoid valve) S2 is a normally closed valve that outputs no oil pressure when not energized. The solenoid valve S2 includes an input port S2a that receives the modulator pressure $P_{MOD}$ via an oil passage (not shown), and an output port S2b that outputs the modulator pressure $P_{MOD}$ generally as it is as a signal pressure (switching signal pressure) $P_{se}$ when energized (that is, when turned on). The output port S2b is connected to an input port 23b of the C-2 supply relay valve 23 via oil passages h1 and h2, and to an oil chamber (second oil chamber) 25e of the second B-2 relay valve 25 via an oil passage h5. The output port S2b is also connected to an oil chamber 24a of the first B-2 relay valve 24 via the oil passage h1 and an oil passage h3, and to an oil chamber (first oil chamber) 25a of the second B-2 relay valve 25 via an oil passage h4.

The first clutch application relay valve 21 includes a spool 21p, a spring 21s that urges the spool 21p downward in the drawing, an oil chamber 21a provided above the spool 21p in the drawing, and an oil chamber 21b provided below the spool 21p in the drawing. The first clutch application relay valve 21 further includes an output port 21c, the input port 21d, an output port 21e, and discharge ports 21f, 21g, and 21h.

In the first clutch application relay valve 21, when the spool 21p is in the left-half position, the input port 21d and the output port 21e are communicated with each other with the input port 21d and the output port 21c not communicated with each other, and the output port 21c and the discharge port 21g are communicated with each other. When the spool 21p is in the right-half position, the input port 21d and the output port 21c are communicated with each other with the input port 21d and the output port 21e not communicated with each other, and the output port 21e and the discharge port 21h are communicated with each other. The discharge ports 21f, 21g, and 21h are connected to oil passages f5, f4, and f3, respectively, and a check valve 53 to discharge an oil pressure.

The input port 21d receives the forward range pressure $P_D$ via the oil passages a1 and a4 as discussed above. The output port 21c, which is communicated with the input port 21d when the spool 21p is in the right-half position, is connected to an input port 22f of the second clutch application relay valve 22 via an oil passage d1. An oil passage d2 is connected to the oil passage d1 so that when the forward range pressure $P_D$ is output from the output port 21c with the spool 21p in the right-half position, the forward range pressure $P_D$ is input to the oil chamber 21a to lock the spool 21p in the right-half position. Meanwhile, the output port 21e, which is communicated with the input port 21d when the spool 21p is in the left-half position, is connected to an input port 22i of the second clutch application relay valve 22 to be discussed later via an oil passage e1. An output port 23g of the C-2 supply relay valve 23, that is, the oil pressure servo 42 for the clutch C-2, is connected to the oil chamber 21b via oil passages c4 and c6.

The second clutch application relay valve 22 includes a spool 22p, a spring 22s that urges the spool 22p upward in the drawing, the oil chamber 22a provided above the spool 22p in the drawing, and an oil chamber 22b provided below the spool 22p in the drawing. The second clutch application relay valve 22 further includes the input port 22c, an output port 22d, an output port 22e, the input port 22f, the input port 22g, an output port 22h, and the input port 22i.

In the second clutch application relay valve 22, when the spool 22p is in the left-half position (normal position), the input port 22c, the output port 22d, and the output port 22e are communicated with each other, the input port 22g and the output port 22h are communicated with each other, and each of the input port 22f and the input port 22i is blocked. When the spool 22p is in the right-half position (failure position, when the solenoid valve S1 to be discussed later is turned off), the input port 22f and the output port 22e are communicated with each other, the input port 22i and the output port 22h are communicated with each other, and the input port 22c, the output port 22d, and the input port 22g are not communicated with each other.

The oil chamber 22a is connected to the output port S1b of the solenoid valve S1 via the oil passages g1 and g2 as discussed above. The input port 22c is connected to the output port SLC1b of the linear solenoid valve SLC1 via the oil passage b1. The input port 22f is connected to the output port 21c of the first clutch application relay valve 21 via the oil passage d1. The output port 22e is communicated with the input port 22c when the spool 22p is in the left-half position, and communicated with the input port 22f and connected to the oil pressure servo 41 for the clutch C-1 via the oil passage b2 when the spool 22p is in the right-half position. An oil chamber 31a of a C-1 damper 31 is connected to the oil passage b2 via an oil passage b3. The output port 22d, which is communicated with the input port 22c when the spool 22p is in the left-half position, is connected to the oil chamber 22b via an oil passage b4.

Meanwhile, the input port 22g is connected to the output port SLC2b of the linear solenoid valve SLC2 via the oil passage c1. The input port 22i is connected to the output port 21e of the first clutch application relay valve 21 via the oil passage e1. The output port 22h is communicated with the input port 22g when the spool 22p is in the left-half position, and communicated with the input port 22i and connected to an input port 23f of the C-2 supply relay valve 23 via oil passages c2 and c3 when the spool 22p is in the right-half position. An oil chamber 32a of a C2-B2 damper 32 is connected to the oil passage c2 via an oil passage c5.

The C-2 supply relay valve 23 includes a spool 23p, a spring 23s that urges the spool 23p upward in the drawing, and the oil chamber 23a provided above the spool 23p in the drawing. The C-2 supply relay valve 23 further includes the input port 23b, the output port 23c, a discharge port 23d, an output port 23e, the input port 23f, the output port 23g, and a discharge port 23h.

In the C-2 supply relay valve 23, when the spool 23p is in the left-half position, the input port 23b and the output port 23c are communicated with each other, the output port 23e and the discharge port 23d are communicated with each other, and the input port 23f and the output port 23g are communicated with each other. When the spool 23p is in the right-half position, the output port 23c and the discharge port 23d are communicated with each other, the input port 23f and the output port 23e are communicated with each other, and the output port 23g and the discharge port 23h are communicated with each other.

The oil chamber 23a is connected to the output port 24b of the first B-2 relay valve 24 to be discussed later via the oil passage g4. The input port 23b is connected to the output port S2b of the solenoid valve S2 via the oil passages h1 and h2. The output port 23c is communicated with the input port 23b when the spool 23p is in the left-half position, and connected to the oil chamber 25e of the second B-2 relay valve 25 via the oil passage h5.

The input port 23f is connected to the output port 22h of the second clutch application relay valve 22 via the oil passages c2 and c3. The output port 23g, which is communicated with the input port 23f when the spool 23p is in the left-half position, is connected to the oil pressure servo 42 for the clutch C-2 via the oil passage e4. The oil passage c4 is also connected to the oil chamber 21b of the first clutch application relay valve 21 via the oil passage c6. The output port 23e, which is communicated with the input port 23f when the spool 23p is in the right-half position, is connected to an input port 24f of the first B-2 relay valve 24 via an oil passage c7.

The first B-2 relay valve 24 includes a spool 24p, a spring 24s that urges the spool 24p upward in the drawing, and the oil chamber 24a provided above the spool 24p in the drawing. The first B-2 relay valve 24 further includes the output port 24b, the input port 24c, an input port 24d, an output port 24e, the input port 24f, and a drain port EX.

In the first B-2 relay valve 24, when the spool 24p is in the left-half position, the input port 24d and the output port 24e are communicated with each other, and the output port 24b and the drain port EX are communicated with each other. When the spool 24p is in the right-half position, the input port 24c and the output port 24b are communicated with each other, and the input port 24f and the output port 24e are communicated with each other.

The oil chamber 24a is connected to the output port S2b of the solenoid valve S2 via the oil passages h1 and h3. The input port 24d is connected to the reverse range pressure output port 26d of the manual shift valve 26, which outputs the reverse range pressure $P_R$, via the oil passages i1 to i4 and i6. The input port 24c is connected to the output port S1b of the solenoid valve S1 via the oil passages g1 and g3. The input port 24f is connected to the output port 23e of the C-2 supply relay valve 23 via the oil passage c7.

The output port 24e is communicated with the input port 24f when the spool 24p is in the right-half position, and communicated with the input port 24d when the spool 24p is in the left-half position. The output port 24e is connected to an inner oil chamber (first hydraulic oil chamber) 45A of the oil pressure servo 45 for the brake B-2 via an oil passage k1. That is, the inner oil chamber 45A is connected to the reverse range pressure output port 26d of the manual shift valve 26 or the output port SLC2b of the linear solenoid valve SLC2. The output port 24b is communicated with the input port 24c when the spool 24p is in the right-half position, and communicated with the drain port EX when the spool 24p is in the left-half position. The output port 24b is connected to the oil chamber 23a of the C-2 supply relay valve 23 via the oil passage g4.

The second B-2 relay valve 25 includes a spool 25p, a spring (urging member) 25s that urges the spool 25p upward in the drawing, the oil chamber 25a provided on the one-end side of (above) the spool 25p in the drawing, and the oil chamber 25e provided on the other-end side of (below) the spool 25p in the drawing. The second B-2 relay valve 25 further includes an input port 25b, an output port 25c, and a discharge port 25d.

In the second B-2 relay valve 25, when the spool 25p is in the left-half position, the input port 25b and the output port 25c are communicated with each other. When the spool 25p is in the right-half position, the discharge port 25d and the output port 25c are communicated with each other.

The oil chamber 25a is connected to the output port S2b of the solenoid valve S2 via the oil passages h1 and h4. The oil chamber 25e is connected to the output port 23c of the C-2 supply relay valve 23 via the oil passage h5. That is, when the C-2 supply relay valve 23 is in the left-half position, the oil chamber 25e is connected to the output port S2b of the solenoid valve S2 to which the oil chamber 25 is also connected.

The input port 25b is connected to the reverse range pressure output port 26d of the manual shift valve 26, which outputs the reverse range pressure $P_R$, via the oil passages i1 to i5. The discharge port 25d is connected to the check valve 54 via an oil passage f8 to discharge an oil pressure. The output port 25e is communicated with the input port 25b when the spool 25p is in the left-half position, and communicated with the discharge port 25d when the spool 25p is in the right-half position. The output port 25c is connected to an outer oil chamber (second hydraulic oil chamber) 45B of the oil pressure servo 45 for the brake B-2 via an oil passage j1. That is, the outer oil chamber 45B is connected to the reverse range pressure output port 26d of the manual shift valve 26 or via the check valve 54 to a drain port EX.

[Operation of Oil Pressure Control Apparatus]

Next, operation of the oil pressure control apparatus 20 according to the embodiment will be described.

When ignition is turned on by a driver, for example, the oil pressure control apparatus 20 starts oil pressure control. First, when the shift lever is selected to be in the P range or the N range, for example, the control section (not shown) issues an electrical command to energize the linear solenoid valve SLC2, the linear solenoid valve SLC3 (not shown), and the solenoid valve S1, which are each a normally open valve, to respectively block communication between the input port and the output port. Then, when the engine is started, for example, an oil pressure is produced by rotation of the oil pump (not shown) based on rotation of the engine. The oil pressure is output as the line pressure $P_L$ and the modulator pressure $N_{MOD}$ after pressure adjustment performed by the primary regulator valve and the solenoid modulator valve. The line pressure $P_L$ is input to the input port 26a of the manual shift valve 26 and the input port of the linear solenoid valve SLC3 (not shown). The modulator pressure $P_{MOD}$ is input to the respective input ports S1a and S2a of the solenoid valves S1 and S2.

Subsequently, when the driver moves the shift lever from the N range to the D range, for example, the forward range pressure $P_D$ is output from the forward range pressure output port 26b of the manual shift valve 26 to the oil passages a1 to a4. The forward range pressure $P_D$ is input to the input port SLC1a of the linear solenoid valve SLC1 via the oil passage a3, to the input port SLC2a of the linear solenoid valve SLC2 via the oil passage a2, and to the input port 21d of the first clutch application relay valve 21 via the oil passage a4.

In the first clutch application relay valve 21, to the input port 21d of which the forward range pressure $P_D$ is input from the oil passage a4, the spool 21p has been positioned in the right-half position by the urging force of the spring 21s immediately after the shift lever is switched to the D range (in the initial stage of an N-D shift) so that the forward range pressure $P_D$ is output from the output port 21c to the oil passage d1. In the second clutch application relay valve 22, however, the input port 22f is blocked with the spool 22p positioned in the left-half position by the urging force of the spring 22s, since the signal pressure $P_{S1}$ is not output with the solenoid valve S1 turned on. In the first clutch application relay valve 21 with the spool 21p in the right-half position, the forward range pressure $P_D$ input from the input port 21d is output from the output port 21c to be input to the oil chamber 21a via the oil passages d1 and d2. Therefore, the spool 21p is locked by the oil pressure applied to the oil chamber 21a and the urging force of the spring 21s.

[Operation for Engagement of Clutch C-1]

Then, when the control section determines any of the first forward speed to the fifth forward speed, for example, the linear solenoid valve SLC1 is turned on by electrical control performed by the control section so that the forward range pressure $P_D$ input to the input port SLC1a is subjected to pressure adjustment control such that the control pressure $P_{SLC1}$ which increases gradually is output from the output port SLC1b as the engagement pressure $P_{C1}$. The control pressure $P_{SLC1}$ (engagement pressure $P_{C1}$) is input to the input port 22c of the second clutch application relay valve 22 via the oil passage b1.

Consequently, in the second clutch application relay valve 22 with the spool 22p in the left-half position, the control pressure $P_{SLC1}$ input to the input port 22c is output from the output port 22d as well as from the output port 22e. The control pressure $P_{SLC1}$ output from the output port 22d is input to the oil chamber 22b via the oil passage b4 to lock the spool 22p of the second clutch application relay valve 22 in the left-half position.

Then, the control pressure $P_{SLC1}$ input from the linear solenoid valve SLC1 to the input port 22c of the second clutch application relay valve 22 as discussed above is output from the output port 22e to the oil pressure servo 41 via the oil passage b2 as the engagement pressure $P_{C1}$ to engage the clutch C-1. Such engagement of the clutch C-1 serves to establish the first forward speed (low shift speed) when combined with engagement of the one-way clutch F-1, to establish the second forward speed when combined with engagement of the brake B-1 achieved on the basis of an engagement pressure $P_{B1}$ (control pressure $P_{SLB1}$) output from the linear solenoid valve SLB1 (not shown), to establish the third forward speed when combined with engagement of the clutch C-3 achieved on the basis of an engagement pressure $P_{C3}$ (control pressure $P_{SLC3}$) output from the linear solenoid valve SLC3 (not shown), to establish the fourth forward speed when combined with engagement of the clutch C-4 achieved on the basis of an engagement pressure $P_{C4}$ (control pressure $P_{SLC4}$) output from the linear solenoid valve SLC4 (not shown), and to establish the fifth forward speed when combined with engagement of the clutch C-2 achieved on the basis of the engagement pressure $P_{C2}$ (control pressure $P_{SLC2}$) output from the linear solenoid valve SLC2 to be discussed later.

Operation for engagement of the brake B-2 during engine braking at the first forward speed will be described in relation to oil pressure supply to the inner oil chamber 45A and the outer oil chamber 45B of the oil pressure servo 45 for the brake B-2 in various states to be discussed in detail later.

The engagement pressure $P_{C1}$ supplied to the oil passage b2 is input to the oil chamber 31a of the C-1 damper 31 via the oil passage b3. The C-1 damper 31 prevents pulsation of the engagement pressure $P_{C1}$ supplied to and discharged from the oil pressure servo 41, and absorbs a surge pressure (abrupt pressure variations).

[Operation for Engagement of Clutch C-2]

Next, when the control section determines any of the fifth forward speed to the eighth forward speed, for example, the normally open linear solenoid valve SLC2, which has been turned on, is turned off (with a reducing current) by electrical control performed by the control section so that the forward range pressure $P_D$ input to the input port SLC2a is subjected to pressure adjustment control such that the control pressure $P_{SLC2}$ which increases gradually is output from the output port SLC2b as the engagement pressure $P_{C2}$. The control pressure $P_{SLC2}$ (engagement pressure $P_{C2}$) is input to the input port 22g of the second clutch application relay valve 22 via the oil passage c1.

In the second clutch application relay valve 22, as discussed above, the signal pressure $P_{S1}$ is not input to the oil chamber 22a with the solenoid valve S1 turned on, and the spool 22p is locked in the left-half position by the engagement pressure $P_{C1}$ input to the oil chamber 22b. Therefore, the control pressure $P_{SLC2}$ (engagement pressure $P_{C2}$) input to the input port 22g is output from the output port 22h as the engagement pressure $P_{C2}$. The engagement pressure $P_{C2}$ output from the output port 22h is input to the input port 23f of the C-2 supply relay valve 23 via the oil passages c2 and c3.

Further, in the C-2 supply relay valve 23, the spool 23p is positioned in the left-half position by the urging force of the spring 23s when the solenoid valve S2 is turned off, and the spool 24p of the first B-2 relay valve 24 is in the left-half position, whereby the oil pressure in the oil chamber 23a and the oil passage g4 is drained. Therefore, the engagement pressure $P_{C2}$ input to the input port 23f is output from the output port 23g. The engagement pressure $P_{C2}$ output from the output port 23g is input to the oil chamber 21b of the first clutch application relay valve 21 via the oil passages c4 and c6 to move the spool 21p of the first clutch application relay valve 21 to the left-half position with the engagement pressure $P_{C2}$ exceeding the urging force of the spring 21s and the forward range pressure $P_D$ in the oil chamber 21a. At this time, the forward range pressure $P_D$ input to the input port 21d via the oil passage a4 is directed to the output port 21e, rather than the output port 21c, to be output to the oil passage e1 However, the forward range pressure $P_D$ is blocked by the input port 22i of the second clutch application relay valve 22. Since the forward range pressure $P_D$ which has been supplied to the oil passage d2 is blocked, the forward range pressure $P_D$ which has been supplied to the oil chamber 21a as a locking pressure is not supplied any more.

The engagement pressure $P_{C2}$ output from the output port 23g of the C-2 supply relay valve 23 is input to the oil pressure servo 42 via the oil passage c4 to engage the clutch C-2. Such engagement of the clutch C-2 serves to establish the fifth forward speed when combined with engagement of the clutch C-1, to establish the sixth forward speed when combined with engagement of the clutch C-4 achieved on the basis of engagement pressure $P_{C4}$ (control pressure $P_{SLC4}$) output from the linear solenoid valve SLC4 (not shown), to establish the seventh forward speed when combined with engagement of the clutch C-3 achieved on the basis of the engagement pressure $P_{C3}$ (control pressure $P_{SLC3}$) output from the linear solenoid valve SLC3 (not shown), and to establish the eighth forward speed when combined with engagement of the brake B-1 achieved on the basis of the engagement pressure $P_{B1}$ (control pressure $P_{SLB1}$) output from the linear solenoid valve SLB1 (not shown).

The engagement pressure $P_{C2}$ supplied to the oil passage c2 is input to the oil chamber 32a of the C2-B2 damper 32 via the oil passage c5. The C2-B2 damper 32 prevents pulsation of the engagement pressure $P_{C2}$ supplied to and discharged from the oil pressure servo 42, and absorbs a surge pressure (abrupt pressure variations).

[Operation during Solenoid All-Off Failure during Forward Running]

Subsequently, operation during a solenoid all-off failure in the oil pressure control apparatus 20 will be described. In the case where all the solenoid valves (the linear solenoid valve SLC1, the linear solenoid valve SLC2, the linear solenoid valve SLC3, the linear solenoid valve SLC4, the linear solenoid valve SLB1, the solenoid valve S1, and the solenoid valve S2) fail (turn off) due to a breakdown, a short circuit, or a wire break of the control section, for example, during normal running with the shift lever in the D range (hereinafter, such an event will be referred to as an "all-off failure"), the linear solenoid valve SLC1, the linear solenoid valve SLC4, the linear solenoid valve SLB1, and the solenoid valve S2, which are each a normally closed valve, do not output an oil pressure, and the linear solenoid valve SLC2, the linear solenoid valve SLC3, and the solenoid valve S1, which are each a normally open valve, output an oil pressure.

During normal running at any of the first forward speed to the fourth forward speed, the spool 21p of the first clutch application relay valve 21 is locked in the right-half position by the forward range pressure $P_D$ input to the oil chamber 21a as discussed above. Therefore, the forward range pressure $P_D$ output from the output port 21c is input to the input port 22f of the second clutch application relay valve 22 via the oil passage d1 to be blocked with the spool 22p of the second clutch application relay valve 22 in the left-half position (normal position).

When an all-off failure occurs in this state, the spool 22p of the second clutch application relay valve 22 is moved to the right-half position (failure position) when the signal pressure $P_{S1}$ output from the solenoid valve S1 is input to the oil chamber 22a via the oil passages g1 and g2, and the forward range pressure $P_D$ input to the input port 22f is output from the output port 22e and input to the oil pressure servo 41 via the oil passage b2 to engage the clutch C-1. The control pressure $P_{SLC2}$ (engagement pressure $P_{C2}$) output from the normally open linear solenoid valve SLC2 is blocked by the input port 22g of the second clutch application relay valve 22 in which the spool 22p has moved to the right-half position. Meanwhile, the normally open linear solenoid valve SLC3 (not shown) outputs the line pressure $P_L$ generally as it is as the engagement pressure $P_{C2}$ to engage the clutch C-3. This allows the clutch C-1 and the clutch C-3 to be engaged to establish the third forward speed (see FIG. 2). That is, in case of an all-off failure during running at any of the first forward speed to the fourth forward speed, the vehicle keeps running at the third forward speed.

During normal running at any of the fifth forward speed to the eighth forward speed, the spool 21p has been moved to the left-half position by inputting the control pressure $P_{SLC2}$ (engagement pressure $P_{C2}$) for the clutch C-2 to the oil chamber 21b of the first clutch application relay valve 21 via the oil passage c1, the second clutch application relay valve 22, the oil passage c2, the C-2 supply relay valve 23, and the oil passage c6 as discussed above. Therefore, the forward range pressure $P_D$ output from the output port 21e is input to the input port 22i of the second clutch application relay valve 22 via the oil passage e1 to be blocked by the spool 22p of the second clutch application relay valve 22 in the left-half position.

When an all-off failure occurs in this state, the spool 22p of the second clutch application relay valve 22 is moved to the right-half position by inputting the signal pressure $P_{S1}$ output from the solenoid valve S1 to the oil chamber 22a via the oil passages g1 and g2. In addition, the spool 24p of the first B-2 relay valve 24 is not moved but maintained in the left-half position when the solenoid valve S2 is turned off, and the signal pressure $P_{S1}$ from the solenoid valve S1 is not output to the oil passage g4 because the oil passage g3 is blocked. Therefore, the C-2 supply relay valve 23 is not moved but maintained in the left-half position. Therefore, the forward range pressure $P_D$ input to the input port 22i of the second clutch application relay valve 22 is output from the output port 22h, and input to the oil pressure servo 42 via the oil passages c2 and c3, the C-2 supply relay valve 23, and the oil passage c4 to engage the clutch C-2. The control pressure $P_{SLC2}$ (engagement pressure $P_{C2}$) output from the normally open linear solenoid valve SLC2 is blocked by the input port 22g of the second clutch application relay valve 22 by the spool 22p moved to the right-half position. However, the forward range pressure $P_D$ output to the oil passages c2 and c3 is output via the C-2 supply relay valve 23 to the oil passage c6 as well to be input to the oil chamber 21b of the first clutch application relay valve 21. Thus, the spool 21p of the first clutch application relay valve 21 is kept locked in the left-half position. The normally open linear solenoid valve SLC3 (not shown) outputs the line pressure $P_L$ generally as it is as the engagement pressure $P_{C3}$ to engage the clutch C-3. This allows the clutch C-2 and the clutch C-3 to be engaged to establish the seventh forward speed (see FIG. 2). That is, in case of an all-off failure during running at any of the fifth forward speed to the eighth forward speed, the vehicle keeps running at the seventh forward speed.

When the vehicle is stopped and the shift lever is moved to the N range during an all-off failure during normal running at any of the fifth forward speed to the eighth forward speed, the manual shift valve 26 stops outputting the forward range pressure $P_D$, and drains the oil pressure via the forward range pressure discharge port 26c, the discharge port 26e, the oil passages f7 and f11, and the check valve 54. Specifically, the forward range pressure $P_D$ is drained from the normally open linear solenoid valve SLC2 and the input port 21d of the first clutch application relay valve 21. Consequently, the forward range pressure $P_D$ which has been input to the oil chamber 21b via the oil passages e1, c2, c3, and c6 is drained to unlock the first clutch application relay valve 21 which has been locked by the forward range pressure $P_D$. This allows the spool 21p of the first clutch application relay valve 21 to be moved to the right-half position by the urging force of the spring 21s.

When the shift lever is in the N range during an all-off failure, the normally open linear solenoid valve SLC3 (not shown), which uses the line pressure $P_L$ as the source pressure, outputs the control pressure $P_{SLC3}$ (engagement pressure $P_{C3}$) which is generally the same as the line pressure $P_L$ to engage the clutch C-3. While the clutch C-3 is engaged, the clutches C-1, C-2, and C-4 and the brakes B-1 and B-2 are disengaged, and the sun gear S3 and the carrier CR2 idle even if reduced-speed rotation is input to the sun gear S2. Therefore, the input shaft 12 and the output shaft 15 are respectively in the neutral state (see FIG. 1).

Then, when the driver operates the shift lever back to the D range, for example, the forward range pressure $P_D$ is output from the forward range pressure output port 26b of the manual shift valve 26. The forward range pressure $P_D$ is input to the input port 21d of the first clutch application relay valve 21 in which the spool 21p has moved to the right-half position, and output from the output port 21c to the oil passage d1. The forward range pressure $P_D$ is then input to the oil pressure servo 41 for the clutch C-1 via the input port 22f of the second clutch application relay valve 22 in which the spool 22p in the right-half position, the output port 22e, and the oil passage b2 to engage the clutch C-1. That is, the vehicle keeps running at the third forward speed in the same way as during an all-off failure during running at any of the first forward speed to the fourth forward speed. This allows the vehicle to start moving again even after the vehicle is stopped after an all-off failure to secure a limp-home function.

[Operation for Engagement of Brake B-2]

Then, supply and discharge of an oil pressure to and from the oil pressure servo 45 for the brake B-2, that is, individual supply and discharge of an oil pressure to and from the inner oil chamber 45A and the outer oil chamber 45B, which is the essence of the present invention, in various states will be described.

{Operation for Engagement of Brake B-2 During Engine Braking at First Forward Speed}

When the control section determines that engine brake is in operation at the first forward speed, for example, in the state where the linear solenoid valve SLC1 is turned on and the clutch C-1 is engaged to establish the first forward speed as described above, the control section issues an electrical command to turn on the solenoid valve S2, turn off the solenoid valve S1, and perform pressure adjustment control on the linear solenoid valve SLC2. When the solenoid valve S2 is turned on, the modulator pressure $P_{MOD}$ input to the input port S2a is output from the output port S2b as the signal pressure $P_{S2}$ to be input to the oil chamber 24a of the first B-2 relay valve 24 via the oil passages h1 and h3. This causes the spool 24p of the first B-2 relay valve 24 to be moved downward in the drawing against the urging force of the spring 24s to the right-half position.

Also at this time, the solenoid valve S1 is turned off, and the signal pressure $P_{S1}$ is output. The signal pressure $P_{S1}$ is input to the input port 24c of the first B-2 relay valve 24 via the oil passages g1 and g3, and further input from the output port 24b of the first B-2 relay valve 24 in which the spool 24p is in the right-half position to the oil chamber 23a of the C-2 supply relay valve 23 via the oil passage g4. Therefore, the spool 23p of the C-2 supply relay valve 23 is moved to the right-half position. While the signal pressure $P_{S1}$ is input to the oil chamber 22a of the second clutch application relay valve 22, the signal pressure $P_{S1}$ is exceeded by the engagement pressure $P_{C1}$ (control pressure $P_{SLC1}$) in the oil chamber 22b discussed above and the urging force of the spring 22s. Therefore, the spool 22 remains locked in the left-half position.

When pressure adjustment control is performed on the linear solenoid valve SLC2 and the control pressure $P_{SLC2}$ is output from the output port SLC2b, the control pressure $P_{SLC2}$ is input via the oil passage c1 to the input port 22g of the second clutch application relay valve 22 in which the spool 22p is locked in the left-half position, and output from the output port 22h to the oil passage c2 as the engagement pressure $P_{B2}$. The engagement pressure $P_{B2}$ output to the oil passage c2 is input to the input port 23f of the C-2 supply relay valve 23 in which the spool 23p is in the right-half position, and output from the output port 23e. The engagement pressure $P_{B2}$ is further input via the oil passage c7 to the input port 24f of the first B-2 relay valve 24 in which the spool 24p is in the right-half position, and output from the output port 24e. The engagement pressure $P_{B2}$ is input to the inner oil chamber 45A of the oil pressure servo 45 via the oil passage k1 to engage the brake B-2. Such engagement of the brake B-2 serves to apply engine braking at the first forward speed when combined with engagement of the clutch C-1. The oil pressure in the oil pressure servo 42 for the clutch C-2 is discharged from the output port 23g of the C-2 supply relay valve 23 to be discharged from the check valve 54 via an oil passage f10 and the oil passage f11.

At this time, when the solenoid valve S2 is turned on, the signal pressure $P_{S2}$ is input to the input port 23b of the C-2 supply relay valve 23 via the oil passage h2. However, the input port 23b of the C-2 supply relay valve 23 in which the spool 23p is in the right-half position is blocked, and the signal pressure $P_{S2}$ is not output to the oil passage h5. Therefore, while the signal pressure PS2 is input to the oil chamber 25a via the oil passage h4, the signal pressure PS2 is not input to the oil chamber 25e. Thus, the signal pressure $P_{S2}$ in the oil chamber 25a exceeds the urging force of the spring 25s to move the spool 25p to the right-half position. Consequently, the output port 25c and the discharge port 25d of the second B-2 relay valve 25 are communicated with each other, that is, the oil pressure in the outer oil chamber 45B is discharged via the oil passages j1, f8, and f11, and the check valve 54.

Thus, during engine braking at the first forward speed, the engagement pressure $P_{B2}$ is supplied to only the inner oil chamber 45A and no oil pressure is supplied to the outer oil chamber 45B so that the brake B-2 is engaged with a low torque capacity compared to a case where the oil pressure is supplied to both the oil chambers. Such a low torque capacity is sufficient to transfer only a rotational force received from the drive wheels during coasting (during engine braking). Because it is only necessary to adjust the oil pressure in only the inner oil chamber 45A, it is possible to provide high response and high controllability compared to a case where the oil pressure in both the oil chambers is controlled.

{Operation for Engagement of Brake B-2 in N-R Shift}

In the neutral state, for example, the linear solenoid valve SLC2, the linear solenoid valve SLC3 (not shown), and the solenoid valve S1, which are normally open, are turned on to output no oil pressure, and the linear solenoid valve SLC1, the linear solenoid valve SLC4 (not shown), the linear solenoid valve SLB1 (not shown), and the solenoid valve S2, which are normally closed, are turned off to output no oil pressure.

When the driver operates the shift lever (not shown) to the R range, for example, the control section detects that the R range is selected through a shift position sensor that detects the shift lever position, and the spool 26p of the manual shift valve 26 is moved to a position corresponding to the R range. In response to such movement of the spool 26p, the control section first turns on the solenoid valve S2.

When the solenoid valve S2 is turned on, the signal pressure $P_{S2}$ is output to be input to the oil chamber 24a of the first B-2 relay valve 24 via the oil passages h1 and h3. This causes the spool 24p of the first B-2 relay valve 24 to be moved downward in the drawing against the urging force of the spring 24s to the right-half position. The solenoid valve S1 is turned on, and the signal pressure $P_{S1}$ is not output. Since the signal pressure $P_{S1}$ is not input to the oil chamber 23a of the C-2 supply relay valve 23, the spool 23p of the C-2 supply relay valve 23 remains in the left-half position. Consequently, the signal pressure $P_{S2}$ input from the oil passage h2 to the input port 23b is input from the output port 23c to the oil chamber 25e of the second B-2 relay valve 25 via the oil passage h2, and also to the oil chamber 25a via the oil passage h4. Therefore, the spool 25p of the second B-2 relay valve 25 is moved to the left-half position by the urging force of the spool 25s to communicate the input port 25b and the output port 25c with each other. The reverse range pressure $P_R$ is output from the reverse range pressure output port 26d of the manual shift valve 26 via the oil passages i1 to i5. The reverse range pressure $P_R$ is supplied to the outer oil chamber 45B via the second B-2 relay valve 25 and the oil passage j1 to engage the brake B-2.

Also at this time, since the spool 24p of the first B-2 relay valve 24 is in the right-half position as discussed above, the reverse range pressure $P_R$ supplied to the input port 24d via the oil passage i6 is blocked, that is, no oil pressure is supplied to the inner oil chamber 45A. Thus, initial engagement of the brake B-2 is first achieved by only the reverse range pressure $P_R$ supplied to the outer oil chamber 45B. Thereafter, electricity applied to the linear solenoid valve SLC3 (not shown) is controlled so as to engage the clutch C-3 through pressure adjustment control in which the engagement pressure $P_{C3}$ for the clutch C-3 is gradually increased. Such engagement of the clutch C-3 serves to establish the reverse speed (REV) when combined with engagement of the brake B-2 (see FIG. 2).

Further thereafter, when a predetermined time elapses after it is detected that the shift lever is operated to the R range, the control section turns off the solenoid valve S2. Consequently, the signal pressure $P_{S2}$, which has been input to the oil chambers 25a and 25e of the second B-2 relay valve 25, is not input to the oil chambers 25a and 25e any more. However, the spool 25p of the second B-2 relay valve 25 is kept in the left-half position by the urging force of the spring 25s. In the first B-2 relay valve 24, the signal pressure $P_{S2}$, which has been input to the oil chamber 24a, is not input to the oil chamber 24a any more. Thus, the spool 24p is moved to the left-half position by the urging force of the spring 24s. Therefore, the reverse range pressure $P_R$ supplied to the input port 24d via the oil passage i6 is supplied to the inner oil chamber 45A via the output port 24e and the oil passage k1.

Thus, the brake B-2 is engaged by the reverse range pressure $P_R$ supplied to both the inner oil chamber 45A and the outer oil chamber 45B, with a high torque capacity compared to a state in which the reverse range pressure $P_R$ is supplied to only one of the oil chambers. By engaging the brake B-2 first with the reverse range pressure $P_R$ supplied to only the outer oil chamber 45 for initial engagement and thereafter with the reverse range pressure $P_R$ supplied to the inner oil chamber 45A as well as described above, the reverse speed which requires a relatively high torque capacity can be established stepwise without causing a speed change shock.

{Operation for Disengagement of Brake B-2 in R-N Shift (R-D Shift) at Normal Oil Temperature}

In the case where the driver operates the shift lever from the R range discussed above to the N range, for example, an oil temperature sensor (not shown) first detects whether or not the oil temperature is in a normal oil temperature range in which the oil temperature is a predetermined temperature (for example, 40° C.) or higher, that is, whether or not the viscosity of the oil is low. If it is detected that the oil temperature is in the normal oil temperature range, for example, the control section performs pressure adjustment control in which the linear solenoid valve SLC3 (not shown) is gradually turned on (so that the engagement pressure $P_{C3}$ is not output) with the solenoid valve S1 kept on and the solenoid valve S2 kept off.

That is, the spool 24p of the first B-2 relay valve 24 and the spool 25p of the second B-2 relay valve 25 are kept in the left-half position. That is, the inner oil chamber 45A is communicated with the reverse range pressure output port 26d via the oil passage k1, the first B-2 relay valve 24, and the oil passages i6 and i4 to i1, and the outer oil chamber 45B is communicated with the reverse range pressure output port 26d via the oil passage j1, the second B-2 relay valve 25, and the oil passages i5 to i1. Since the driver moves the spool 26p of the manual shift valve 26 to a position corresponding to the N range, the reverse range pressure output port 26d is communicated with the discharge port 26f, the oil passage f6, and the check valve 55. That is, the oil pressure in the inner oil chamber 45A and the outer oil chamber 45B is discharged from the check valve 55 to disengage the brake B-2.

When the reverse range pressure $P_R$ is discharged, the check ball 71 blocks the oil passage i3 to reduce the discharge rate compared to the supply rate. Meanwhile, pressure adjustment control is performed such that the linear solenoid valve SLC3 (not shown) gradually reduces the engagement pressure $P_{C3}$ for the clutch C-3 to disengage the clutch C-3 as well, which brings the automatic transmission 1 into the neutral state.

In the case where the driver operates the shift lever from the R range discussed above to the D range, for example, the brake B-2 and the clutch C-3 are disengaged in the same way as discussed above. Then, pressure adjustment control is continuously performed such that the linear solenoid valve SLC1 gradually increases the engagement pressure $P_{C1}$ for the clutch C-1 to engage the clutch C-1, which causes the automatic transmission 1 to establish the first forward speed. At this time, even if disengagement of the brake B-2 has been delayed by the check ball 71 or the like and the brake B-2 has been still engaged, that state would be the same as the state during engine braking at the first forward speed (see FIG. 2), which involves no problem in particular.

{Operation for Disengagement of Brake B-2 in R-N Shift at Low Oil Temperature}

On the other hand, in the case where the driver operates the shift lever from the R range discussed above to the N range, for example, and the oil temperature sensor detects that the oil temperature is in a low oil temperature range in which the oil temperature is less than the predetermined temperature, that is, the oil is highly viscous, the control section turns off the solenoid valve S1 and turns on the solenoid valve S2. Consequently, the signal pressure $P_{S2}$ is output from the solenoid valve S2 to be input to the oil chamber 24a of the first B-2 relay valve 24 via the oil passages h1 and h3. This causes the spool 24p of the first B-2 relay valve 24 to be moved downward in the drawing against the urging force of the spring 24s to the right-half position.

Also at this time, the solenoid valve S1 is turned off and the signal pressure $P_{S1}$ is output. The signal pressure $P_{S1}$ is input to the input port 24c of the first B-2 relay valve 24 via the oil passages g1 and g3, and further input from the output port 24b of the first B-2 relay valve 24 in which the spool 24p is in the right-half position to the oil chamber 23a of the C-2 supply relay valve 23 via the oil passage g4. Therefore, the spool 23p of the C-2 supply relay valve 23 is moved to the right-half position. In the second clutch application relay valve 22, the signal pressure $P_{S1}$ is input to the oil chamber 22a, and therefore the spool 22p is moved to the right-half position with the signal pressure $P_{S1}$ exceeding the urging force of the spring 22s. The spool 21p of the first clutch application relay valve 21 has been positioned in the right-half position on the basis of the urging force of the spring 21s.

The solenoid valve S2 is turned on, and the signal pressure $P_{S2}$ is input to the input port 23b of the C-2 supply relay valve 23 via the oil passage h2. However, the input port 23b of the C-2 supply relay valve 23 in which the spool 23p is in the right-half position is blocked, and thus the signal pressure $P_{S2}$ is not output to the oil passage h5. Therefore, while the signal pressure PS2 is input to the oil chamber 25a via the oil passage h4, the signal pressure PS2 is not input to the oil chamber 25e. Thus, the signal pressure $P_{S2}$ in the oil chamber 25a exceeds the urging force of the spring 25s to move the spool 25p to the right-half position.

Because the respective spools 24p, 23p, and 22p of the first B-2 relay valve 24, the C-2 supply relay valve 23, and the second clutch application relay valve 22 are moved to the right-half position as described above, the oil pressure which has been supplied to the inner oil chamber 45A is discharged from the check valve 53 through the oil passage k1, the first B-2 relay valve 24 in which the spool 24p is in the right-half position, the oil passage c7, the C-2 supply relay valve 23 in which the spool 23p is in the right-half position, the oil passages c3 and c2, the second clutch application relay valve 22 in which the spool 22p is in the right-half position, the oil passage e1, the first clutch application relay valve 21 in which the spool 21p is in the right-half position, and the oil passage f3. The oil pressure which has been supplied to the outer oil chamber 45B is discharged from the check valve 54 through the oil passage j1, the second B-2 relay valve 25 in which the spool 25p is in the right-half position, and the oil passage f8.

This allows the oil pressure to be quickly discharged, specifically because the oil pressure does not pass through the check ball mechanism 60, compared to a case where the oil pressure at a normal temperature is discharged via the manual shift valve 26. Thus, so-called quick draining can be performed to quickly disengage the brake B-2 even in a state in which the oil is highly viscous and less responsive. Meanwhile, pressure adjustment control is performed such that the linear solenoid valve SLC3 (not shown) gradually reduces the engagement pressure $P_{C3}$ for the clutch C-3 to disengage the clutch C-3 as well, which brings the automatic transmission 1 into the neutral state.

{Operation for Disengagement of Brake B-2 in R-D Shift at Low Oil Temperature}

Meanwhile, in the case where the driver quickly operates the shift lever from the R range discussed above to the D range, for example, and the oil temperature sensor detects that the oil temperature is in the low oil temperature range in which the oil temperature is less than the predetermined temperature, that is, the oil is highly viscous, the control section turns on the solenoid valve S1 and turns on the solenoid valve S2. Consequently, the signal pressure $P_{S1}$ is not output from the solenoid valve S1, but the signal pressure $P_{S2}$ is output from the solenoid valve S2. Therefore, the signal pressure $P_{S2}$ is first input to the oil chamber 24a of the first B-2 relay valve 24 via the oil passages h1 and h3. This causes the spool 24p of the first B-2 relay valve 24 to be moved downward in the drawing against the urging force of the spring 24s to the right-half position.

Also at this time, the solenoid valve S1 is turned on, and the signal pressure $P_{S1}$ is not output. Thus, while the oil passages g1, g3, and g4 are communicated with each other by the first B-2 relay valve 24 in which the spool 24p is in the right-half position, the signal pressure $P_{S1}$ is not input to the oil chamber 23a of the C-2 supply relay valve 23. Thus, the spool 23p of the C-2 supply relay valve 23 remains in the left-half position. Consequently, the oil passages h2 and h5 are communicated with each other by the C-2 supply relay valve 23 in which the spool $23_D$ is in the left-half position. In the second B-2 relay valve 25, the signal pressure $P_{S2}$ is input to the oil chamber 25a via the oil passage h4, and to the oil chamber 25e via the oil passages h2 and h5. Therefore, the spool 25p is kept in the left-half position by the urging force of the spring 25s. In the second clutch application relay valve 22, the signal pressure $P_{S1}$ is not input to the oil chamber 22a, and thus the spool 22p has been positioned in the left-half position on the basis of the urging force of the spring 22s.

Because the spool 24p of the first B-2 relay valve 24 is moved to the right-half position and the spool 23p of the C-2 supply relay valve 23 is moved to the left-half position as described above, the oil pressure which has been supplied to the inner oil chamber 45A is discharged from the check valve 54 through the oil passage k1, the first B-2 relay valve 24 in which the spool 24p is in the right-half position, the oil passage c7, the C-2 supply relay valve 23 in which the spool 23p is in the left-half position, an oil passage f9, and the oil passage f11. The oil pressure which has been supplied to the outer oil chamber 45B is discharged from the check valve 55 through the oil passage j1, the second B-2 relay valve 25 in which the spool 25p is in the left-half position, the oil passages i5 to i1, the reverse range pressure output port 26d and the discharge port 26f of the manual shift valve 26, and the oil passage f6.

This allows the oil pressure which has been supplied to the inner oil chamber 45A to be quickly discharged, specifically because the oil pressure does not pass through the check ball mechanism 60, compared to a case where the oil pressure at a normal temperature is discharged via the manual shift valve 26. Thus, so-called quick draining can be performed even in a state in which the oil is highly viscous and less responsive. The oil pressure which has been supplied to the outer oil chamber 45B is discharged via the check ball mechanism 60 and the manual shift valve 26. Such discharge may be delayed so that the brake B-2 may remain engaged. Such remaining engagement of the brake B-2 would not affect establishment of the first forward speed immediately after a shift to the D range (see FIG. 2), and thus would involve no problem in particular.

{Operation for Prevention of Engagement of Brake B-2 during Reverse Control}

On the other hand, in the case where the driver erroneously operates the shift lever from the D range to the R range during running at a predetermined speed (for example, 7 km/h) or higher, for example, it is determined to execute reverse control (reverse inhibit control) for preventing establishment of the reverse speed. That is, during the reverse control, the control section turns off the solenoid valve S1 and turns on the solenoid valve 52. Consequently, the signal pressure $P_{S2}$ is output from the solenoid valve S2 to be input to the oil chamber 24a of the first B-2 relay valve 24 via the oil passages h1 and h3. This causes the spool 24p of the first B-2 relay valve 24 to be moved downward in the drawing against the urging force of the spring 24s to the right-half position.

Also at this time, the solenoid valve S1 is turned off, and the signal pressure $P_{S1}$ is output. The signal pressure $P_{S1}$ is input to the input port 24c of the first B-2 relay valve 24 via the oil passages g1 and g3, and further input from the output port 24b of the first B-2 relay valve 24 in which the spool 24p is in the right-half position to the oil chamber 23a of the C-2 supply relay valve 23 via the oil passage g4. Therefore, the spool 23p of the C-2 supply relay valve 23 is moved to the right-half position. In the second clutch application relay valve 22, the signal pressure $P_{S1}$ is input to the oil chamber 22a, and therefore the spool 22p is moved to the right-half position with the signal pressure $P_{S1}$ exceeding the urging force of the spring 22s.

The solenoid valve S2 is turned on, and the signal pressure $P_{S2}$ is input to the input port 23b of the C-2 supply relay valve 23 via the oil passage h2. However, the input port 23b of the C-2 supply relay valve 23 in which the spool 23p is in the right-half position is blocked, and thus the signal pressure $P_{S2}$ is not output to the oil passage h5. Therefore, while the signal pressure $P_{S2}$ is input to the oil chamber 25a via the oil passage h4, the signal pressure $P_{S2}$ is not input to the oil chamber 25e. Thus, the signal pressure $P_{S2}$ in the oil chamber 25a exceeds the urging force of the spring 25s to move the spool 25p to the right-half position.

Meanwhile, the spool 26p of the manual shift valve 26 is moved to a position corresponding to the R range. Therefore, the forward range pressure $P_D$, which has been output from the forward range pressure output port 26b, is not output from the forward range pressure output port 26b any more, and the reverse range pressure $P_R$ is output from the reverse range pressure output port 26d to the oil passages i1 to i6. However, the reverse range pressure $P_R$ supplied to the oil passage i5 is blocked by the input port 25b of the second B-2 relay valve 25 in which the spool 25p is in the right-half position, and is not supplied to the outer oil chamber 45B. The reverse range pressure $P_R$ supplied to the oil passage i6 is blocked by the input port 24d of the first B-2 relay valve 24 in which the spool 24p is in the right-half position, and is not supplied to the inner oil chamber 45A. Thus, the brake B-2 is prevented from being engaged so that the reverse speed is not established. The linear solenoid valve SLC3 is immediately turned on so that the engagement pressure $P_{C3}$ is not output. That is, the clutch C-3 is immediately disengaged.

{Operation for Engagement of Brake B-2 in R Range during Solenoid All-Off Failure}

In the case where the driver operates the shift lever to the R range when an all-off failure discussed above occurs, all the solenoid valves are turned off, thus the solenoid valve S1 and the solenoid valve S2, are turned off as discussed above. Thus, the signal pressure $P_{S1}$ is output from the normally open solenoid valve S1, and the signal pressure $P_{S2}$ is not output from the normally closed solenoid valve S2. Therefore, the signal pressure $P_{S2}$ is not input to the oil chamber 24a of the first B-2 relay valve 24 and the oil chambers 25a and 25e of the second B-2 relay valve 25 so that the spools 24p and 25p of the first B-2 relay valve 24 and the second B-2 relay valve 25 are respectively moved to the left-half position on the basis of the urging force of the springs 24s and 25s.

Therefore, the reverse range pressure $P_R$ output from the reverse range pressure output port 26d of the manual shift valve 26 to the oil passages i1 to i6 is supplied to each of the input port 24d of the first B-2 relay valve 24 and the input port 25b of the second B-2 relay valve 25. Then, the reverse range pressure $P_R$ is supplied from the first B-2 relay valve 24 in which the spool 24p is in the left-half position to the inner oil chamber 45A via the output port 24e and the oil passage k1, and from the second B-2 relay valve 25 in which the spool 25p is in the left-half position to the outer oil chamber 45B via the output port 25c and the oil passage j1. This causes the brake B-2 to be engaged.

The signal pressure $P_{S1}$ supplied from the solenoid valve S1 to the oil passage g3 is blocked by the input port 24c, but the signal pressure $P_{S1}$ supplied via the oil passage g2 moves the spool 22p of the second clutch application relay valve 22 to the right-half position. When the driver operates the shift lever to the R range, however, the forward range pressure $P_D$ is not output from the manual shift valve 26. Thus, the forward range pressure $P_D$ is not supplied to the oil pressure servo 41 for the clutch C-1 and the oil pressure servo 42 for the clutch C-2 as discussed above so that the clutch C-1 and the clutch C-2 are not engaged.

An oil pressure (line pressure $P_L$) is supplied from the normally open linear solenoid valve SLC3 (not shown) which uses the line pressure $P_L$ as the source pressure to an oil pressure servo for the clutch C-3 (not shown) to engage the clutch C-3. When the clutch C-3 is engaged, as shown in FIG. 1, reduced-speed rotation obtained by reducing the speed of rotation of the input shaft 12 by the planetary gear DP is input to the sun gear S2 of the planetary gear unit PU. Also, when the brake B-2 is engaged, the carrier CR2 is held stationary so that reverse rotation at a reduced speed is output from the ring gear R3 to the output shaft 15, that is, the automatic transmission 1 establishes the reverse speed. Even during an all-off failure, as described above, the reverse speed can be established when the driver operates the shift lever to the R range, which improves the limp-home function by enabling both forward and rearward travel even in a limp-home state.

CONCLUSION

According to the oil pressure control apparatus 20 which has been described above, the first B-2 relay valve 24 is switched on the basis of the signal pressure $P_{S2}$ from the solenoid valve S2, and the second B-2 relay valve 25 is switched on the basis of the signal pressure $P_{S1}$ from the fail-safe solenoid valve S1. Thus, an oil pressure can be individually supplied to and discharged from the inner oil chamber 45A and the outer oil chamber 45B by two solenoid valves, namely the solenoid valve S1 which switches the second clutch application relay valve 22 and the solenoid valve S2, without impairing a fail-safe function.

Since an oil pressure can be individually supplied to and discharged from the inner oil chamber 45A and the outer oil chamber 45B as described above, an oil pressure can be supplied to and discharged from the oil pressure servo 45 for the brake B-2 in correspondence with all kinds of states such as "during engine braking at the first forward speed", "in an N-R shift", "in an R-N shift at a normal oil temperature", "in an R-D shift at a normal oil temperature", "in an R-N shift at a low oil temperature", "in an R-D shift at a low oil temperature", "during reverse control", and "during a solenoid all-off failure".

The second clutch application relay application valve 22 serves to secure supply of the oil pressure to the oil pressure servo 41 for the clutch C-1 or the oil pressure servo 42 for the clutch C-2 which has been engaged before the second clutch application relay valve 22 is switched when the second clutch application relay valve 22 is switched. Thus, the engagement state of the clutch C-1 and the clutch C-2 is kept even if the signal pressure $P_{S1}$ is output from the solenoid valve S1 during normal running. That is, the solenoid valve S1 can be turned on and off during normal running. This eliminates the need to provide an additional solenoid valve that switches the second B-2 relay valve 25, and allows the common use of the solenoid valve S1 also as a solenoid valve that switches the second B-2 relay valve 25. Thus, the number of solenoid valves can be reduced to reduce the cost and the size of the oil pressure control apparatus.

The second B-2 relay valve 25 is switched when the signal pressure $P_{S2}$ is input to the oil chamber 25a and the oil chamber 25e and the signal pressure $P_{S1}$ is output to switch the C-2 supply relay valve 23 such that the signal pressure $P_{S2}$ for the oil chamber 25e is blocked by the C-2 supply relay valve 23 and is not input to the oil chamber 25e. Thus, the second B-2 relay valve 25 can be switched on the basis of whether or not the signal pressure $P_{S1}$ is output. That is, the solenoid valve S1 can change whether an oil pressure is supplied to or discharged from the outer oil chamber 45B. Since the same signal pressure $P_{S2}$ is input to the oil chamber 25a and the oil chamber 25e, no pressure difference occurs between the oil chambers to prevent the second B-2 relay valve 25 from being erroneously switched.

The first B-2 relay valve 24 is interposed between the reverse range pressure output port 26d and the inner oil chamber 45A, and blocks the reverse range pressure $P_R$ for the inner oil chamber 45A when the first B-2 relay valve 24 is switched on the basis of the signal pressure $P_{S2}$, while the second B-2 relay valve 25 is interposed between the reverse range pressure output port 26d and the outer oil chamber 45B, and blocks the reverse range pressure $P_R$ for the outer oil chamber 45B when the second B-2 relay valve 25 is switched with the signal pressure $P_{S2}$ for the oil chamber 25e blocked on the basis of the signal pressure $P_{S1}$. Thus, the reverse range pressure $P_R$ can be individually supplied to and discharged from the inner oil chamber 45A and the outer oil chamber 45B in the oil pressure servo 45 for the brake B-2, which is engaged in the R range.

In particular, since the reverse range pressure $P_R$ can be individually supplied to and discharged from the inner oil chamber 45A and the outer oil chamber 45B as described above, it is possible to perform stepwise oil pressure supply control in which the reverse range pressure $P_R$ is first supplied to only the outer oil chamber 45B and thereafter supplied also to the inner oil chamber 45A in an N-R shift, which reduces a speed change shock in an N-R shift.

The brake B-2 which is engaged and disengaged by an oil pressure in the inner oil chamber 45A serves as a friction engagement element to be engaged during engine braking (during coasting) at the first forward speed, and the C-2 supply relay valve 23 serves as a valve that distributes the engagement pressure $P_{SLC2}$ output from the linear solenoid valve SLC2 to the oil pressure servo 42 for the clutch C-2, which is engaged at higher speeds in the forward range (the fifth forward speed to the eighth forward speed), and via the first B-2 relay valve 24 to the inner oil chamber 45A in accordance with the switching position of the C-2 supply relay valve 23. Thus, the engagement pressure $P_{SLC2}$ from the linear solenoid valve SLC2 can be supplied to the inner oil chamber 45A during engine braking at the first forward speed, for which a low torque capacity is sufficient. The C-2 supply relay valve 23 can be commonly used as a valve that blocks the signal pressure $P_{S2}$ for the oil chamber 25e of the second B-2 relay valve 25, which eliminates the need to provide an additional valve, enabling reduction of the cost and the size of the oil pressure control apparatus 20.

In the embodiment described above, the oil pressure control apparatus 20 is applied to the automatic transmission 1 which establishes eight forward speeds and a reverse speed. However, the automatic transmission is not limited thereto, and the oil pressure control apparatus 20 may be applied to an automatic transmission that establishes six forward speeds and a reverse speed, for example. That is, the oil pressure control apparatus 20 may be applied to any automatic transmission that includes a friction engagement element that is engaged and disengaged through two hydraulic oil chambers (an inner oil chamber and an outer oil chamber) and a fail-safe solenoid valve S1.

The oil pressure control apparatus for an automatic transmission according to the present invention can be used for automatic transmissions mounted on passenger cars, trucks, buses, agricultural machines, and so forth, and is in particular suitable for use for an automatic transmission for which it is required to individually supply and discharge an oil pressure to and from first and second hydraulic oil chambers that engage and disengage one friction engagement element and for which it is desired to reduce the number of solenoid valves.

What is claimed is:

1. An oil pressure control apparatus for an automatic transmission, wherein
    an oil pressure servo that engages and disengages one friction engagement element includes first and second hydraulic oil chambers to engage the friction engagement element with a low torque capacity when an oil pressure is supplied to the first hydraulic oil chamber or the second hydraulic oil chamber and with a torque capacity higher than the low torque capacity when an oil pressure is supplied to both the first and second hydraulic oil chambers, and
    the oil pressure control apparatus includes a failure solenoid valve that can output a failure signal pressure when a failure occurs and a failure switching valve that is switched from a normal position to a failure position on the basis of the failure signal pressure, and is constructed to secure supply of the oil pressure to an oil pressure servo for the friction engagement element which has been engaged before the failure switching valve is switched when the failure switching valve is switched, the oil pressure control apparatus comprising:
    a first switching valve that changes whether an oil pressure is supplied to or discharged from the first hydraulic oil chamber;
    a second switching valve that changes whether an oil pressure is supplied to or discharged from the second hydraulic oil chamber; and
    a switching solenoid valve that can output a switching signal pressure that switches the first switching valve, wherein
    the second switching valve is switched on the basis of the failure signal pressure, and
    an oil pressure can be individually supplied to and discharged from the first and second hydraulic oil chambers on the basis of the switching signal pressure from the switching solenoid valve and the failure signal pressure from the failure solenoid valve.

2. The oil pressure control apparatus for an automatic transmission according to claim 1, further comprising a third switching valve that is switched by the failure signal pressure, wherein
    the second switching valve includes a spool, an urging member that urges the spool to one side, a first oil chamber that is provided at one end of the spool and that receives the switching signal pressure to cause the switching signal pressure to act on the spool against an urging force of the urging member, and a second oil chamber that is provided at the other end of the spool and that receives the switching signal pressure via the third switching valve, and
    the second switching valve is switched on the basis of the failure signal pressure when the switching signal pressure is output and the failure signal pressure is output and the third switching valve is switched to block the switching signal pressure for the second oil chamber such that the switching signal pressure is not input to the second oil chamber.

3. The oil pressure control apparatus for an automatic transmission according to claim 2, wherein
- the one friction engagement element is a friction engagement element to be engaged in a reverse range,
- the oil pressure control apparatus includes a manual shift valve that outputs a reverse range pressure from a reverse range pressure output port in the reverse range,
- the first switching valve is interposed between the reverse range pressure output port and the first hydraulic oil chamber, and blocks the reverse range pressure for the first hydraulic oil chamber when the first switching valve is switched on the basis of the switching signal pressure, and
- the second switching valve is interposed between the reverse range pressure output port and the second hydraulic oil chamber, and blocks the reverse range pressure for the second hydraulic oil chamber when the switching signal pressure for the second oil chamber is blocked on the basis of the failure signal pressure to switch the second switching valve.

4. The oil pressure control apparatus for an automatic transmission according to claim 2, wherein
- the one friction engagement element is a friction engagement element to be engaged during coasting at a low shift speed in a forward range,
- the oil pressure control apparatus includes an engagement pressure solenoid valve that performs pressure adjustment control on at least an engagement pressure to be supplied to an oil pressure servo for the friction engagement element to be engaged at a high shift speed in the forward range, and
- the third switching valve is formed by a valve that distributes the engagement pressure output from the engagement pressure solenoid valve to the oil pressure servo for the friction engagement element to be engaged at the high shift speed in the forward range and via the first switching valve to the first hydraulic oil chamber in accordance with a switching position of the third switching valve.

* * * * *